(12) United States Patent
Maggiore et al.

(10) Patent No.: US 12,091,177 B2
(45) Date of Patent: Sep. 17, 2024

(54) AIRCRAFT EQUIPPED WITH A STRUCTURALLY INTEGRATED DE-ICING SYSTEM

(71) Applicant: POLITECNICO DI TORINO, Turin (IT)

(72) Inventors: Paolo Maggiore, Turin (IT); Carlo Giovanni Ferro, Turin (IT); Sara Varetti, Turin (IT); Fabio Vitti, Turin (IT)

(73) Assignee: POLITECNICO DI TORINO, Turin (IT)

( * ) Notice: Subject to any disclaimer, the term of this patent is extended or adjusted under 35 U.S.C. 154(b) by 375 days.

(21) Appl. No.: 16/338,487

(22) PCT Filed: Sep. 19, 2017

(86) PCT No.: PCT/IB2017/055651
§ 371 (c)(1),
(2) Date: Mar. 31, 2019

(87) PCT Pub. No.: WO2018/060808
PCT Pub. Date: Apr. 5, 2018

(65) Prior Publication Data
US 2020/0031479 A1    Jan. 30, 2020

(30) Foreign Application Priority Data
Sep. 30, 2016 (IT) .......................... 102016000098196

(51) Int. Cl.
*B64D 15/04* (2006.01)
*B64D 33/02* (2006.01)

(52) U.S. Cl.
CPC ............. *B64D 15/04* (2013.01); *B64D 33/02* (2013.01); *B64D 2033/0233* (2013.01)

(58) Field of Classification Search
CPC . B64D 15/04; B64D 33/02; B64D 2033/0233
See application file for complete search history.

(56) References Cited

U.S. PATENT DOCUMENTS

| 1,703,612 A | 2/1929 | Carousso |
| 1,879,717 A | 9/1932 | Sikorsky |

(Continued)

FOREIGN PATENT DOCUMENTS

| EP | 0376371 A2 | 7/1990 |
| EP | 0893342 A2 | 1/1999 |
| EP | 1801390 A2 | 6/2007 |

(Continued)

OTHER PUBLICATIONS

International Search Report for PCT/IB2017/055651 dated Dec. 15, 2017.

(Continued)

*Primary Examiner* — Richard Green
*Assistant Examiner* — Steven J Shur
(74) *Attorney, Agent, or Firm* — Hedman & Costigan, P.C.; James V. Costigan; Kathleen A. Costigan

(57) ABSTRACT

An aircraft (A) comprising at least a component part (1, 2, 3, 4, 5, 6, 7, 8) provided with thermal de-icing means (S) suitable to eliminate and/or prevent the formation of ice on said component part, said de-icing means (S) are directly integrated in the structure of said part (1, 2, 3, 4, 5, 6, 7, 8).

15 Claims, 9 Drawing Sheets

(56) References Cited

U.S. PATENT DOCUMENTS

Figure 1:
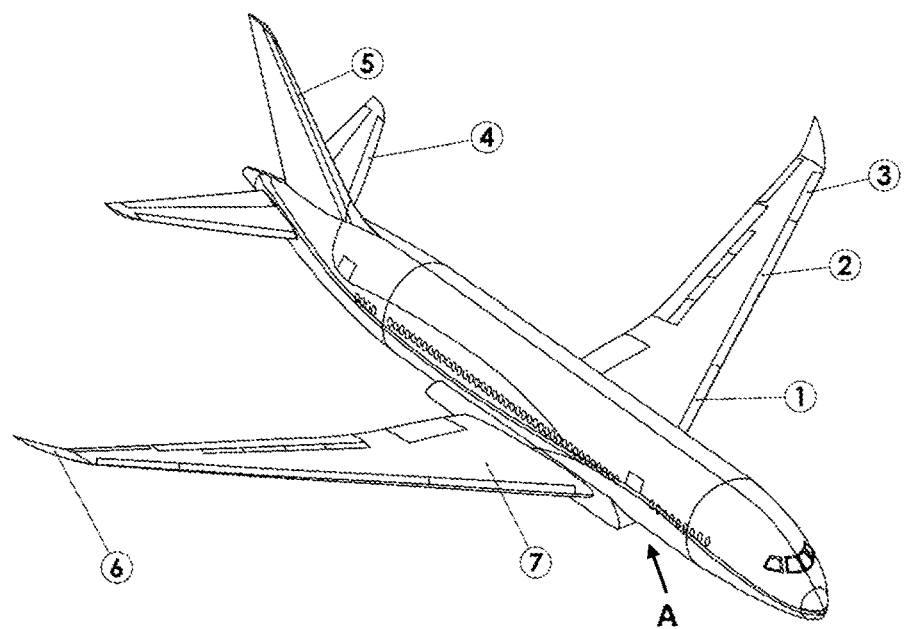

| | | | |
|---|---|---|---|
| 2,328,079 | A | 8/1943 | Goodman |
| 2,390,093 | A | 12/1945 | Ed |
| 2,447,095 | A | 8/1948 | Schmidt |
| 2,470,128 | A | 5/1949 | Barrick |
| 2,478,878 | A | 8/1949 | Smith |
| 2,556,736 | A | 6/1951 | Palmatier |
| 2,737,874 | A | 3/1956 | Gallay |
| 4,615,499 | A | 10/1986 | Knowler |
| 4,741,499 | A | 5/1988 | Rudolph |
| 4,752,049 | A * | 6/1988 | Cole ............ B64D 15/04 244/134 B |
| 5,011,098 | A * | 4/1991 | McLaren ........ B64D 27/14 244/134 B |
| 5,114,100 | A * | 5/1992 | Rudolph ........ B64D 15/04 244/130 |
| 8,146,866 | B2 | 4/2012 | Tenebre |
| 2005/0023412 | A1* | 2/2005 | Baptist ............ F02C 7/047 244/10 |
| 2012/0152443 | A1 | 6/2012 | Chelin |
| 2013/0181093 | A1 | 7/2013 | Inoue |
| 2014/0151353 | A1 | 6/2014 | Steinwandel |

FOREIGN PATENT DOCUMENTS

| | | |
|---|---|---|
| EP | 3018051 A1 | 5/2016 |
| GB | 2319943 A | 6/1998 |

OTHER PUBLICATIONS

Written Opinion of the International Searching Authority dated Dec. 15, 2017.

Nazir, A., et al., A State-of-the-Art Review on Types, Design, Optimization, and Additive Manufacturing of Cellular Structures; Int. J. Adv. Manuf. Technol. (published online Jul. 10, 2019) vol. 104:pp. 3489-3510), Springer-Verlag London Ltd, part of Springer Nature 2019.

Tao, W., et al., Design of Lattice Structure for Additive Manufacturing; Proceedings of ISFA2016, pp. 325-332, 2016 International Symposium on Flexible Automation, Cleveland, Ohio, USA Aug. 1-3, 2016.

* cited by examiner

AIRCRAFT EQUIPPED WITH A STRUCTURALLY INTEGRATED DE-ICING SYSTEM

The present invention relates to an aircraft equipped with a structurally integrated de-icing system.

The present invention is advantageously applied to the field of civil or military aviation, as well as in missile and/or space applications, in order to eliminate and/or prevent the formation of ice on the component parts of aircraft, in particular but not exclusively on wings and/or on propellers and/or on engine fans of the aircraft themselves, to which the following description will make explicit reference without thereby losing generality. In general, in an aircraft some parts or areas, such as the leading edges of the wing, flaps of the leading edge (slat, slot, etc.), spoilers, air brakes, inlet edges of the engine air intake, fan blades of the engine and/or propellers, have de-icing or ice removing units mounted with the specific aim of eliminating and/or preventing the formation of ice on the parts themselves. Thermal de-icing units of the type including a variety of complex sub-systems including the distribution tubes of heated air, stiffeners and brackets for supporting them, connections, nozzles, retrieval systems and the like suitable to be joined firmly to the primary structure of a wing by means of riveting, gluing or welding, are currently known and widely used. This multitude of discrete components just increases the costs of the aircraft as well as the complexity and time of the relevant maintenance.

The necessary control checks lead to a further increase of operating costs and reduce the operation time of the aircraft.

In addition, this very complex multi-component configuration does not always optimize the fluid force of the de-icing hot air: very often, there are inefficient systems with a low thermal efficiency, that force more hot air to be bled from the motor, reducing their performances. A last drawback of this system is obviously the weight added to the aircraft, that is subtracted from the payload.

Specifically, the wide state of the art concerning de-icing systems comprises the following patent documents: U.S. Pat. No. 1,703,612 to Corusso describes how the gas exhausted from the engines of a biplane aircraft can be used as a de-icing system if passed inside the wings, also acting as a silencer by eliminating the noise of the exhaust gases;

U.S. Pat. No. 1,879,717 to Sikorski, from what is apparent from the drawings, intends to use the on-board pneumatic system not only for the motion of the movable surfaces, but also for crushing the ice or de-icing;

U.S. Pat. No. 2,328,079 to Goodman proposes to use inflatable elements to be affixed to the leading edge, blown by means of the exhaust gases hot air, which avoid the formation of ice;

U.S. Pat. No. 2,390,093 to Murray uses a porous leading edge through which the de-icing fluid flows externally on the aerodynamic surface, and in this way the formation of ice is thus prevented;

U.S. Pat. No. 2,447,095 to Schmidt introduces for the first time a thermal de-icing system consisting of tubes which carry hot air up to the inner surface of the panel, possibly perforated;

U.S. Pat. No. 2,470,128 to Barrick describes a constructive technique for a leading edge with tubes therein, which facilitate the forced path of the air close to the outer sheet. The solution uses many corrugated, preformed sections;

U.S. Pat. No. 2,478,878 to Smith describes a thermal de-icing system composed of ducts which are riveted to create the interstices needed to heat the outer sheet. The assembly consists of many components;

U.S. Pat. No. 2,556,736 to Palmatier describes a de-icing system for rotating structures such as helicopter blades or the like. The structure is composed of air passages and ducts which are always fastened by means of rivets to the supporting structure with an increase of weight, an increase of maintenance costs and of the relevant time;

U.S. Pat. No. 2,737,874 to Gallay proposes also a heating and ventilation system for the wings and other parts of the aircraft by means of ducts, which can also carry out a conditioning of the air by varying its temperature;

U.S. Pat. No. 4,615,499 to Knowler proposes a thermal de-icing system with telescopic tubes for the slats of a liner aircraft;

U.S. Pat. No. 4,741,499 to Rudolph proposes a thermal de-icing system to heat the edge of the wing together with the system for hot air generation, both electrically and mechanically, by taking air from compressors or from a suitable combustor;

U.S. Pat. No. 4,752,049 to Cole describes a de-icing system for a thermal slat that utilizes a heat exchanging chamber that stores hot air and disperses it by heating the outer sheet of the slat, and in so doing it de-ices also the portions behind it;

U.S. Pat. No. 5,011,098 to McLaren describes a particular layout of a de-icing system and its relevant manufacturing method by press-forming. The system is a thermal system with multiple ducts that intake hot air and distribute it on the inner wall of the sheet metal, by heating it. The manufacturing method ensures the absence of rivets or gluing;

U.S. Pat. No. 5,114,100 to Rudolph discloses a system for the wing leading edges of aircraft in which the hot air is carried through tubes to panel cavities, and from there it is output to the outside for controlling the laminar flow; although it exploits the panel conductivity, this patent does not integrate the system in the primary structures, and does not solve the problem of the connections of multiple parts, with consequent increases in production and maintenance costs;

GB 2319943 to Rauch proposes an electrical de-icing system wherein conductive strips are attached by gluing on the primary structure and that, upon heating, cause the ice melting or prevent its formation. Nowadays, this solution is not applicable on aircraft of large dimensions due the enormous amount of electric power required;

U.S. Pat. No. 8,146,866 to Tenebre illustrates a method that uses ultrasound generated by a network or mesh of piezoelectric elements to create waves which prevent or remove the ice built up on the leading edge of the wing;

U.S. Pat. No. 0,181,093 to Nobuo uses a wave generator to create pressure waves in front of the aircraft that solidify the spread water droplets before they impact on the sheet metal.

It is important to underline that none of the above patent documents describe de-icing systems that are directly integrated into the primary and aerodynamic structure of the aircraft, in a single solid piece, without the need of forming, riveting, gluing and so forth, that lead to an undesired considerable increase in the production and management costs of the aircraft, as well as to a high complexity and duration of the relative maintenance.

Therefore, the object of the present invention is to provide an aircraft equipped with a de-icing system capable of eliminating the drawbacks of the prior art described above.

The structural and functional features of the present invention and its advantages compared to the known prior art will become even clearer and more evident from the claims below, and in particular from a discussion of the following description, made with reference to the drawings in the enclosed FIGS. 1 to 15.

With particular reference to the attached FIG. 1, an aircraft is shown and its structural composing parts are designated by the reference numerals 1-7, in which it is possible to arrange, directly integrated within the parts themselves, a de-icing system: 1, 2 and 3 refer to both the fixed and extensible positions of the leading edge (flaps of the leading edge) of the wing. This is made possible thanks to the integration into the structural panel of ducts that convey hot air; 4 indicates a possible point of application of the stabilizer on the leading edge, while 5 indicates another possible point placed at the leading edge of the drift; 6 indicates a totally sandwiched winglet with a trabecular structure core that integrates therein the de-icing ducts; finally, 7 indicates the back of the wing as a possible location of a de-icing system.

Figure 2:
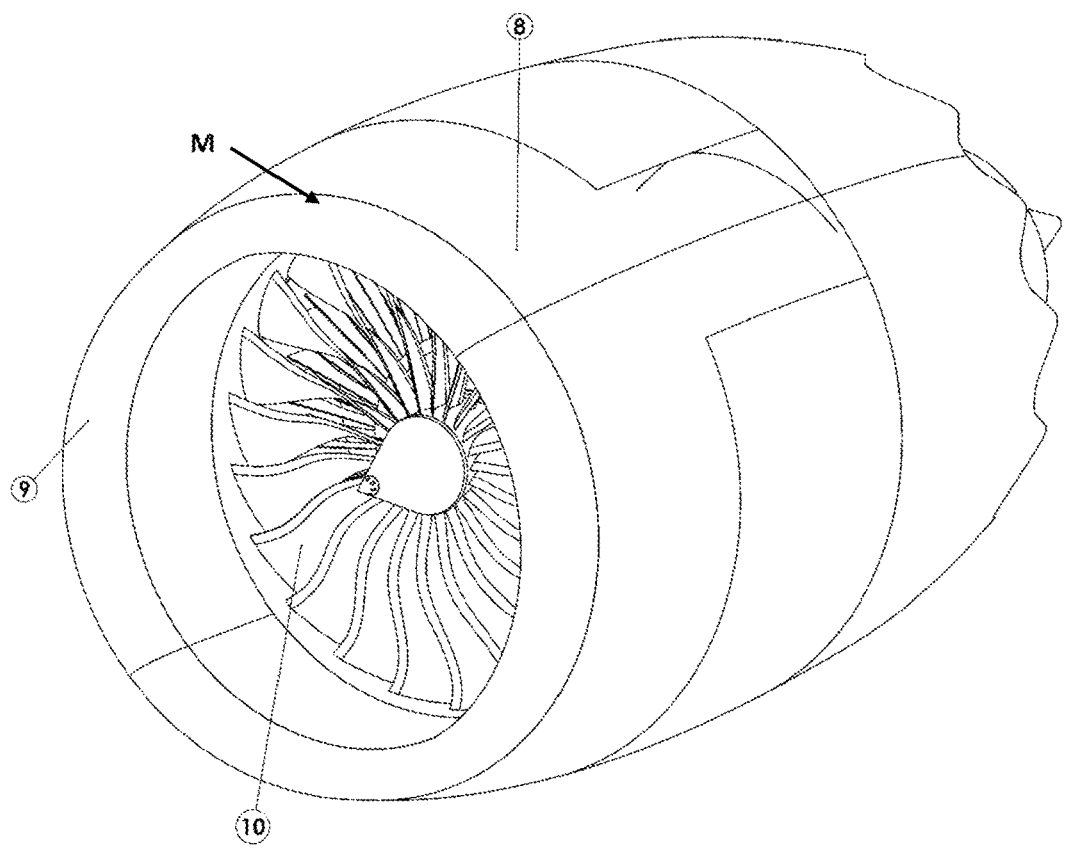
Figure 3:
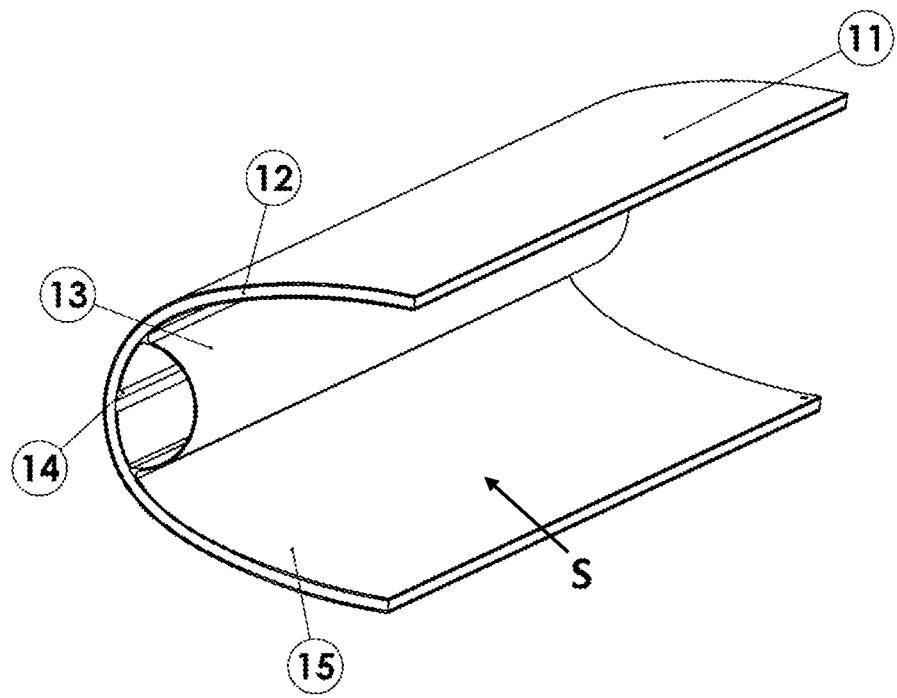

According to the alternative shown in FIG. 2, another part of the aircraft A is proposed, in which the de-icing system can be integrated directly, i.e. in an engine M of the aircraft itself. In this way, a de-icing system does not add weight to the aircraft structure and shape complications are avoided, therefore it can be installed either on the engine nacelles as shown in 8 or on the leading edge of the air intake or also directly integrated within the fan structure as shown in 9 and 10. It is therefore possible to obtain a fan or a propeller blade totally made by additive manufacturing which incorporates a de-icing system therein.

Figure 4:
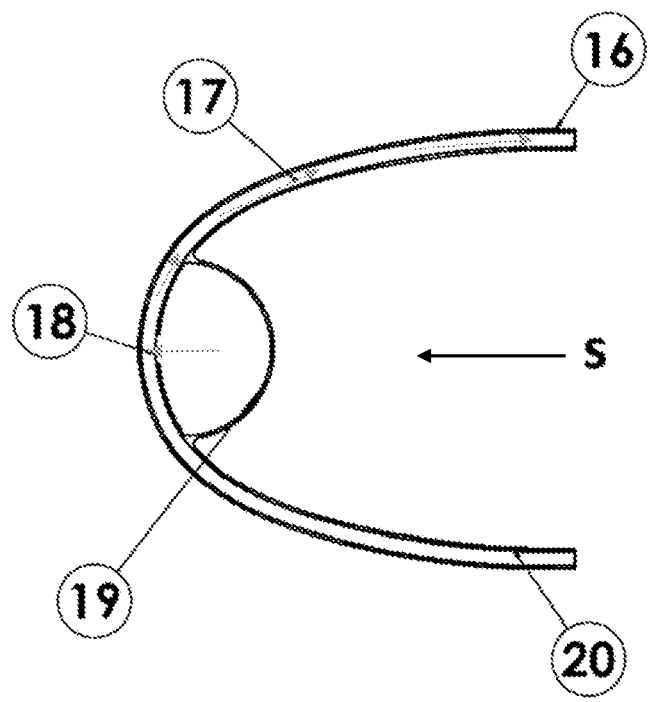

As shown in FIGS. 3 to 6, the de-icing system S of the aircraft comprises: an outer sheet metal 11 that constitutes the aerodynamic surface of the aircraft A itself made in a single piece with the multi-layer panel core 12, a single tube 13 that transfers the hot air bled from the engine compressor and distributes it to the not stochastic foam through the slot 14, the layer 15 inside the multi-layer panel that is also made integrally in a single component, the external layer 16, the multi-layer panel 17, the slot 18 of hot air intake, the duct 19 that carries the same hot air from the source and the internal layer 20 of the multi-layer panel. In FIG. 4 arrows are depicted to explain the path of the hot air of the system: the air flow passes through the central tube and then enters the trabecular core through the slot 18 or through suitable holes (not shown), then passes into trabeculae and enters the wing structure to the end of the curved panel, by now cooled.

Figure 5:
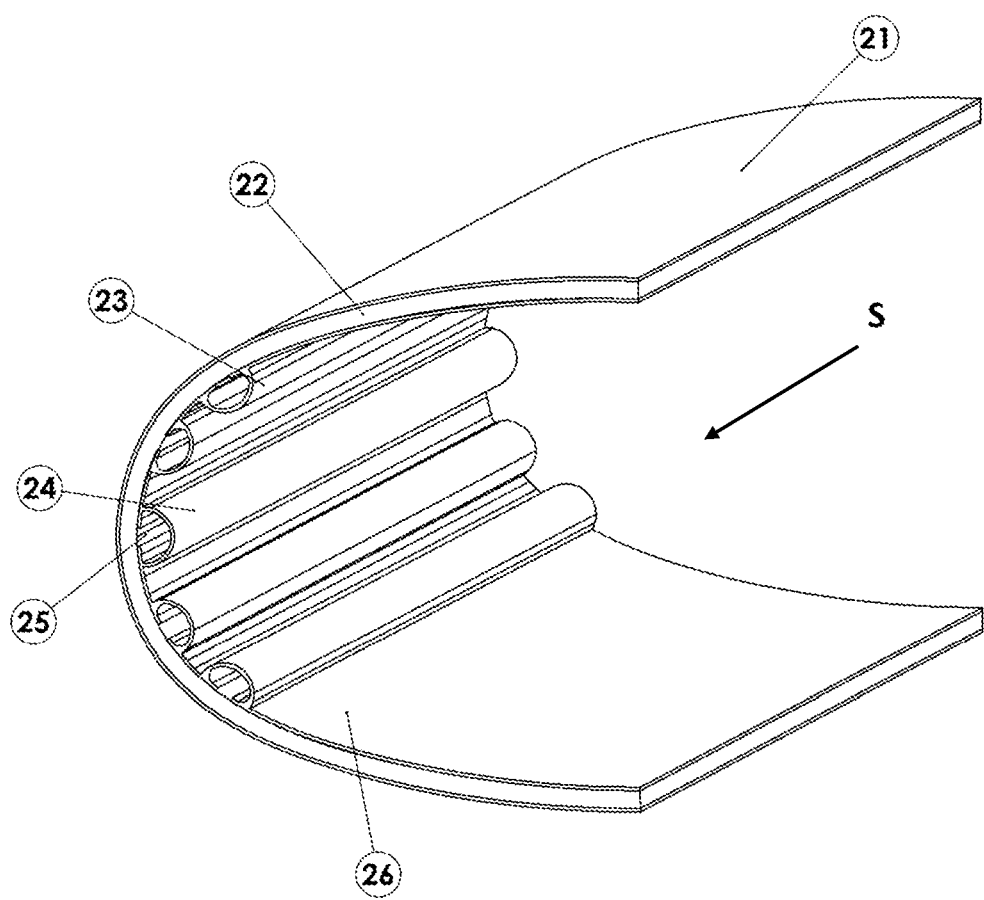

FIG. 5 shows a variant of the system S using, instead of a single tube, multiple conveyance tubes. This solution can also be made in a single component and has as the advantage to selectively pass the air into one of the tubes, of variable number in order to optimize the de-icing by localizing it only where necessary: such alternative comprises the external layer 21, the trabecular core 22 with a cellular structure, whereas 23 refers to one of the tubes which may have sections different from that envisaged, another tube 24 always integrated in the structure with a single component and of different shape and size, also with vertical development, the air inlet slot 25 which can be composed of a series of small holes, and the structure 26 inside the multi-function panel.

Figure 6:
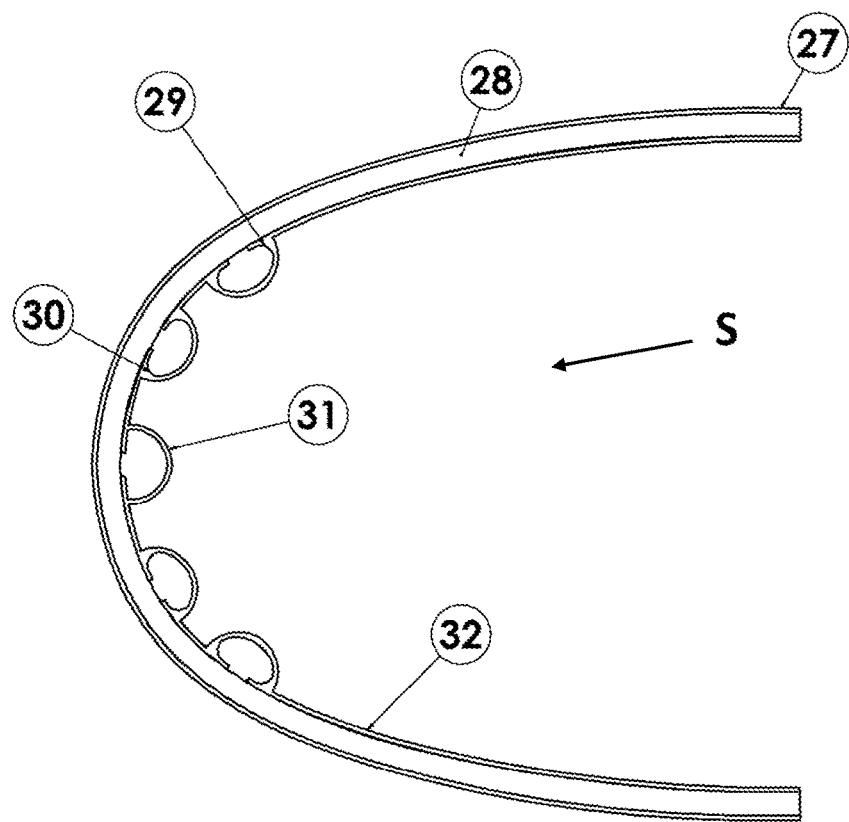

FIG. 6 shows the components set forth in FIG. 5 in cross section: the external layer 27 of the panel, the trabecular core 28, a first tube 29 and a second tube 30 of the tubes integrated in the inner part of the panel.

It is important to note, as also highlighted by 31, that such tubes can have different shapes and sizes and that can also vary in length to optimize the de-icing power of the multi-function structure where required; point 32 highlights also the flat part inside the multi-layer and multi-function panel.

Figure 7:
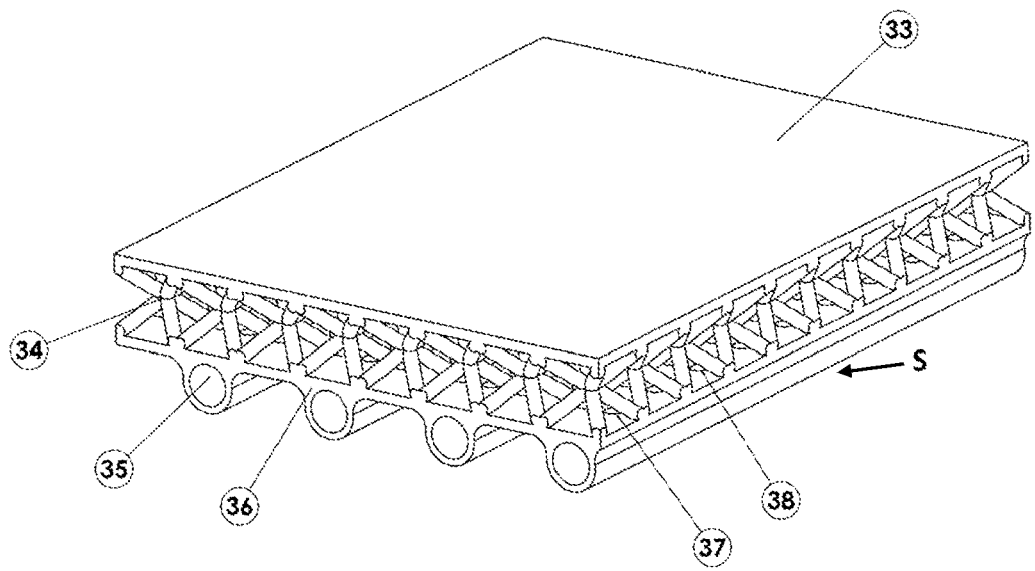

As shown in FIG. 7, a detail of the above multi-function structure is shown: 33 refers to the outer layer of the sandwich panel which also acts as an aerodynamic surface, and 34 instead refers to the internal structure, shown here as a centred-body, open structure. References 35 and 36 illustrate the hot air conveyance tubes connected to the area of the trabecular structures through holes 37 and 38.

Figure 8:
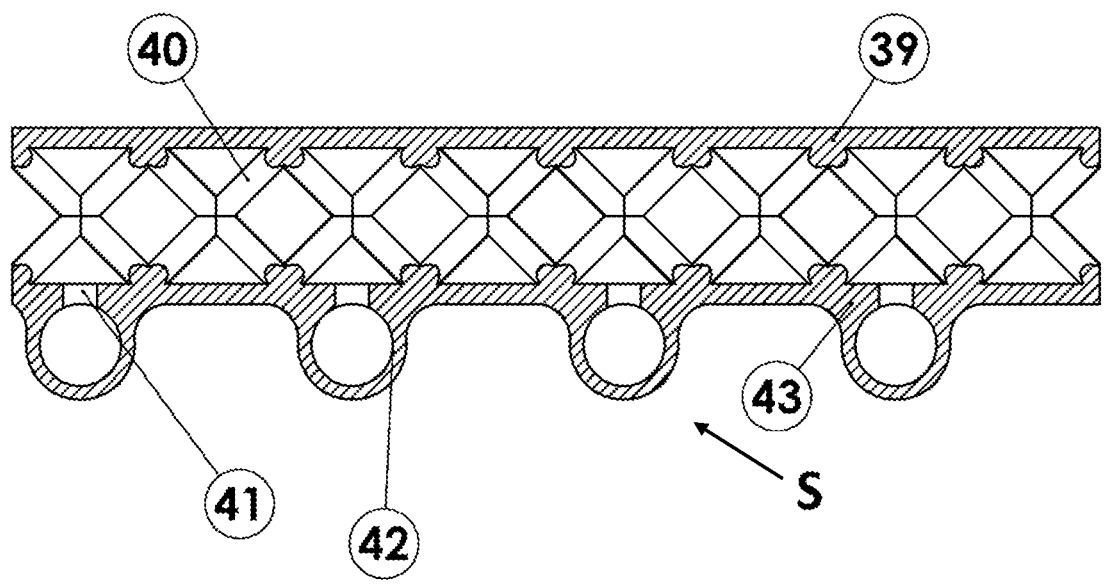

FIG. 8 shows a cross section of the detail of FIG. 7, where 39 shows the uninterrupted joints between the trabecular structure and the outer surface, made in a single element without welding nor gluing. It should be noted that the shape of the cells referred as 40 can have varying geometry and dimensions. 41 refers to the outlet hole of the hot air from the tube to the cellular structure, that can also be replaced by a slot. 42 refers to a conveyance tube and 43 refers to the continuity between the tube and the structure itself, so as to increase the mechanical and thermodynamic properties of the system.

Figure 9:
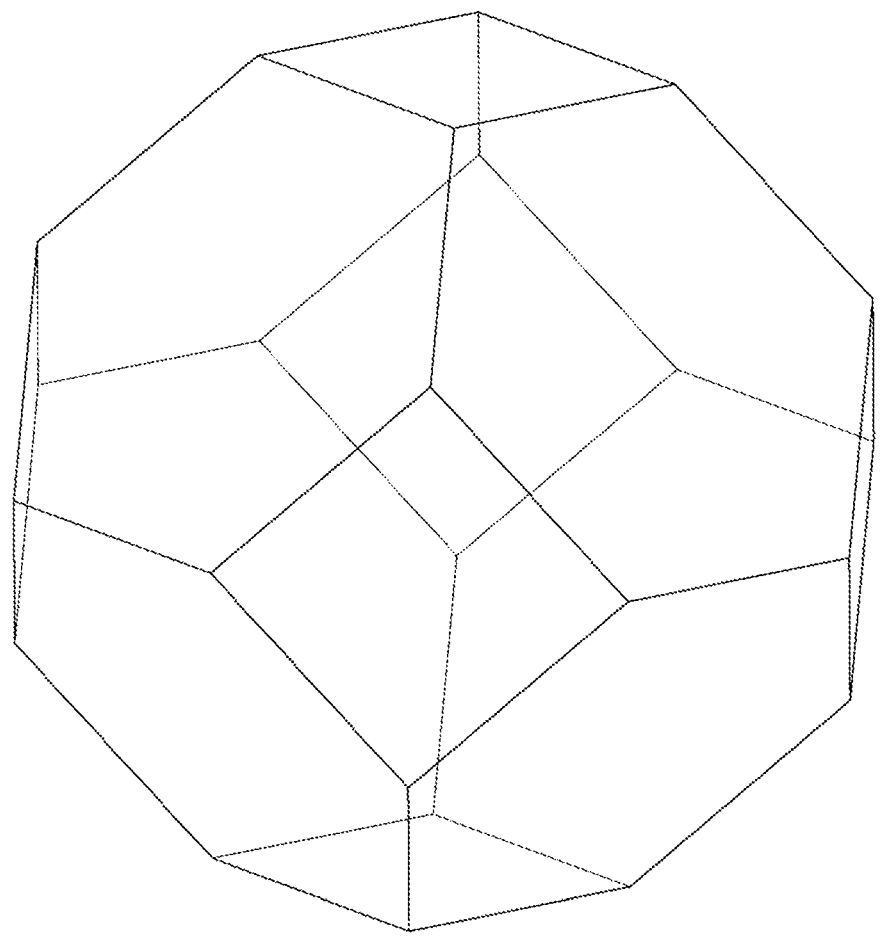
Figure 10:
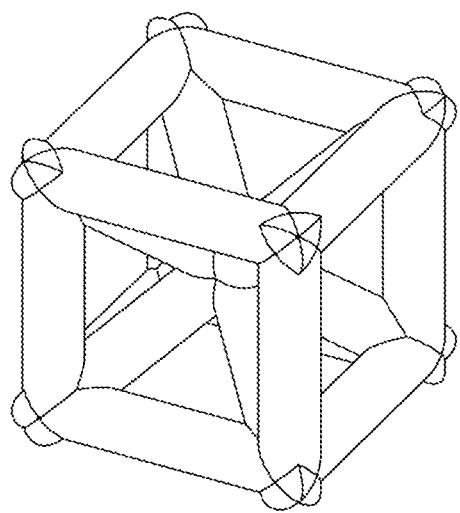
Figure 11:
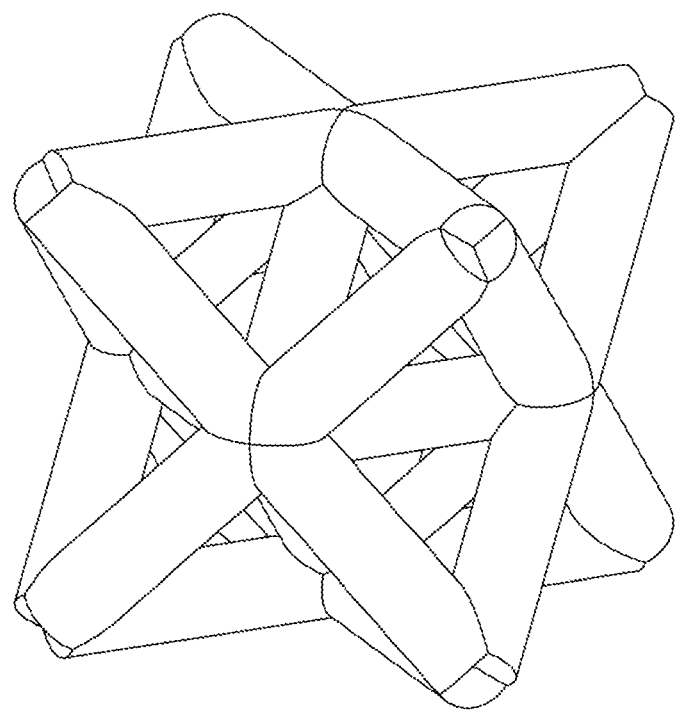
Figure 12:
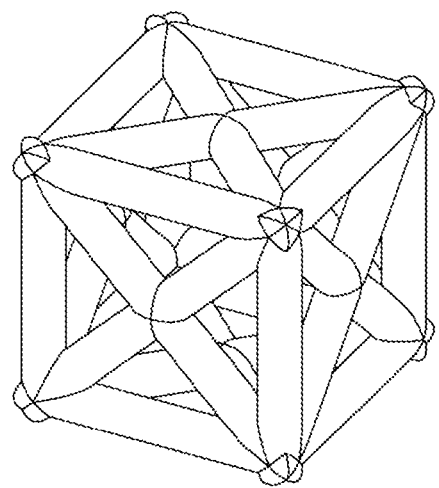
Figure 13:
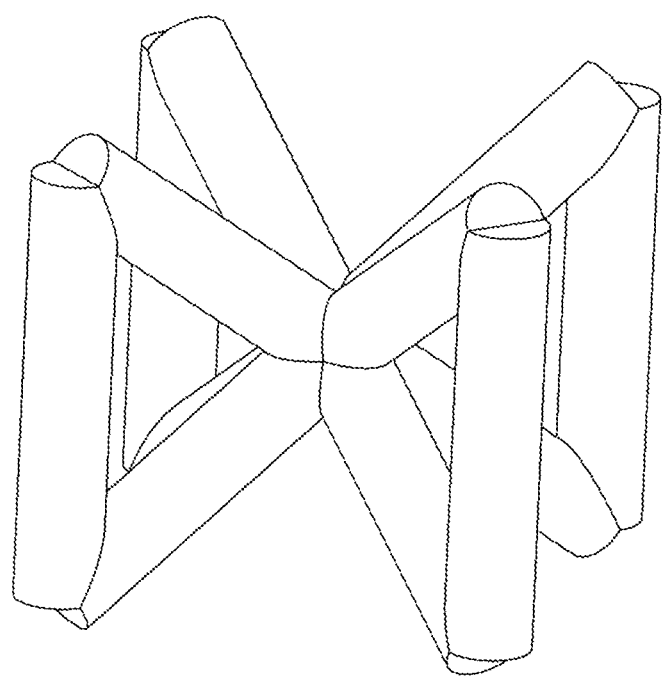
Figure 14:
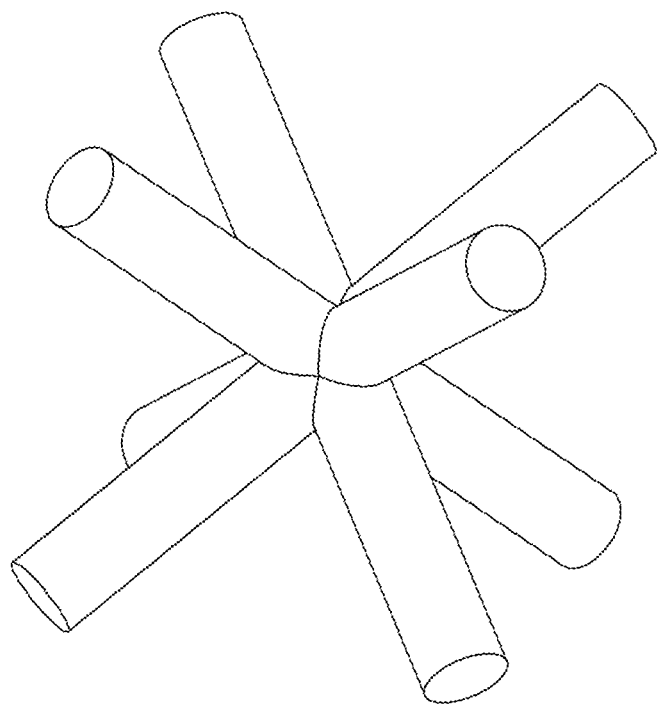
Figure 15:
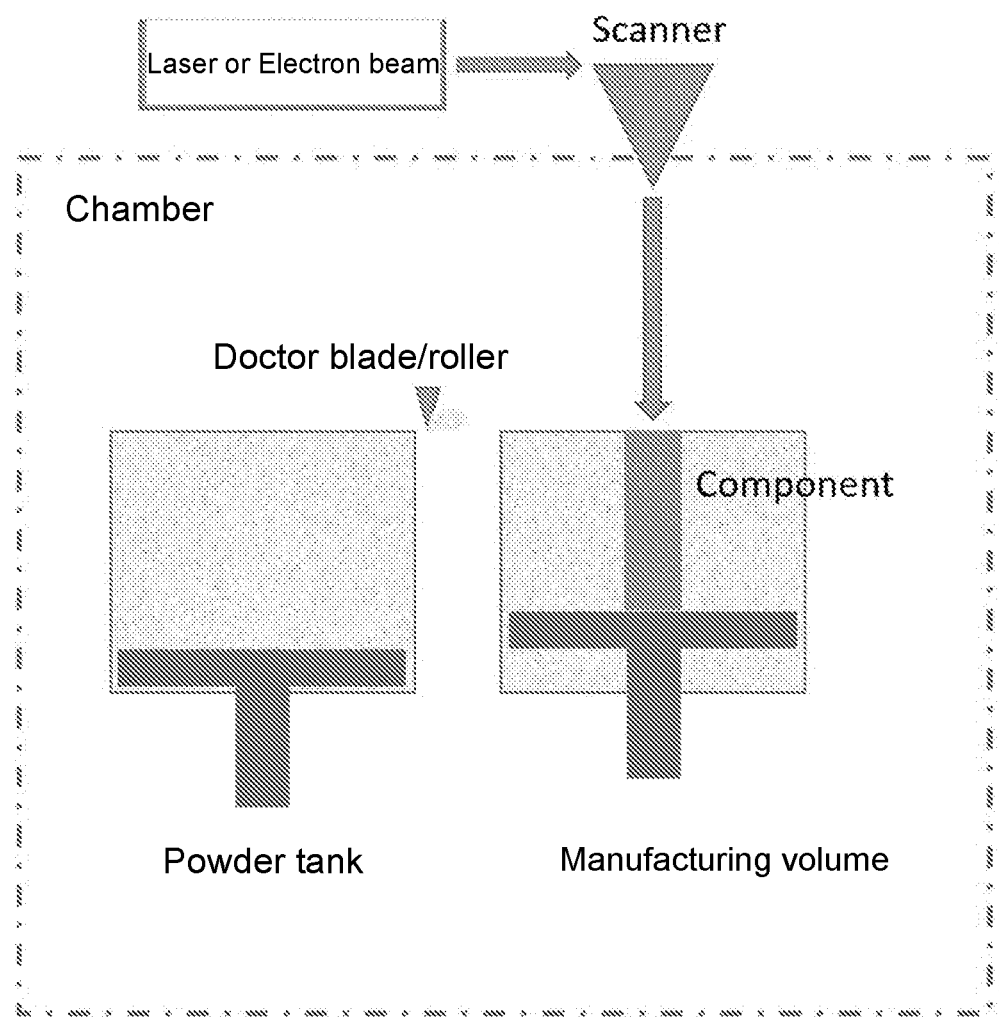

FIGS. 9 to 14 show some of the cellular structures proposed for the implementation of the above mentioned system parts: FIG. 9 represents a tetrakisdecahedron or Kelvin structure, FIG. 10 is a centred-body cube, FIG. 11 is a composition of nested cubic structures, FIG. 12 is a cubic structure with centred faces, FIG. 13 is formed from a centred-body cube on which—for technological reasons—horizontal beams are deleted from, FIG. 14 shows a body-centred cubic structure without frame beams. Finally, FIG. 15 illustrates the selected production process which allows to build the component part(s) of the aircraft A in a single piece: inside a manufacturing chamber, a doctor blade or roller drags the powder from a tank to a mobile manufacturing table, a laser or electron beam, appropriately deflected, selectively melts a section of the component (for example the outer layers, tubes and cellular core), after melting, the table is lowered and a new layer of powder is spread, that is melted again in a selective manner.

Therefore, the present invention solves the problem of the excessive bleeding of hot air from the turbine engine compressor allowing a reduction higher than 30%. This bleeding is required in order to prevent the formation of ice on the leading edges of the aerodynamic surfaces of the aircraft.

In addition, open and closed cell, non-stochastic cellular structures are used to carry out at the same time structural and de-icing functions within a sandwich panel; being a single piece that can be mounted directly on the aircraft thanks to the choice of constructive technology, the number of parts is reduced; problems of coupling structures and systems by means of gluing, riveting or welding are eliminated or drastically reduced to a minimum, and consumptions are reduced significantly.

Still, it must be highlighted: a thermal efficiency, thanks to turbulence appropriately created through the passages inside the cellular structure, which maximizes the heat exchange of the hot air with the outer surface; a structural efficiency: by integrating the entire system (also manifold tubes) into the structure, a significant weight reduction is obtained; a structural improvement to fatigue by eliminating rivets, welding or gluing; an aerodynamic improvement by eliminating external riveting; the reduction of Part Numbers that allows a more simplified and quicker mounting and maintenance; it allows different versions with different de-icing configurations that can be mounted in a totally interchangeable manner depending on the travelled route to minimize the bled air and the weight of the system; the selected manufacturing process, AM Powder Bed, allows the creation of mixed solid-trabecular structures into a single component, consequently the costs of post welding/brazing controls are cancelled, as well as of scraps; the process has a reduced environmental impact: by melting only the required material (aluminium or titanium alloys in case of high-performance applications) waste by chip removal is avoided. Also, non-compliant parts, not being contaminated, may be re-gas-atomized to generate new powder; as regards applications on fans and propellers, the electric power required for de-icing with an important system advantage (no sliding contacts) is eliminated; the costs of tooling for the press-forming techniques presently existing in most de-icing systems are eliminated; scale effects are eliminated, making it virtually possible to change the panel geometry without increasing its costs: in this way, even small series of aircraft (General Aviation) that now cannot benefit from a thermal de-icing system due to cost issues, could do so.

The invention claimed is:

1. An aircraft (A) comprising at least a component part (1, 2, 3, 4, 5, 6, 7, 8) provided with thermal de-icing means (S) suitable to eliminate or prevent the formation of ice on said component part, wherein said thermal de-icing means (S) are directly integrated in the structure of said component part (1, 2, 3, 4, 5, 6, 7, 8), characterized in that said de-icing means (S) comprise a multi-layer panel (17) having an external sheet metal (11) that constitutes an aerodynamic surface of said component part, and an internal layer (15), all made in a single piece comprising a trabecular core (12) having a cellular structure that provides turbulent flow of hot air through passages in said cellular structure which is formed in a single body which provides a structural function for said component part and said thermal deicing means (S) and also functions as a deicing duct, and at least one tube (13, 18) for spreading hot air that is bled from an engine compressor (8) of said aircraft (A) into the trabecular core (12) through a slot (14) in the internal layer of the multi-layer panel (17).

2. An aircraft according to claim 1, characterized in that said part (1, 2, 3, 4, 5, 6, 7, 8) comprises a fixed or extensible leading edge of a wing (1, 2, 3).

3. An aircraft according to claim 1, characterized in that said part (1, 2, 3, 4, 5, 6, 7, 8) comprises a leading edge of a stabilizer (4).

4. An aircraft according to claim 1, characterized in that said part (1, 2, 3, 4, 5, 6, 7, 8) comprises a leading edge of a drift (5).

5. An aircraft according to claim 1, characterized by the fact that said part (1, 2, 3, 4, 5, 6, 7, 8) comprises a winglet (6).

6. An aircraft according to claim 1, characterized in that said part (1, 2, 3, 4, 5, 6, 7, 8) comprises a top surface or back (7) of a wing.

7. An aircraft according to claim 1, characterized in that said part (1, 2, 3, 4, 5, 6, 7, 8) comprises a portion of an engine group (8) of said aircraft (A).

8. An aircraft according to claim 7, characterized in that said portion comprises a nacelle of said engine group (8).

9. An aircraft according to claim 7, characterized in that said portion comprises a leading edge of an air intake (9) of said engine group (8).

10. An aircraft according to claim 7, characterized in that said portion comprises a fan (10) of said engine group (8).

11. An aircraft according to claim 1, characterized in that said trabecular core comprises an open cell non-stochastic cellular structure.

12. An aircraft according to claim 1, characterized in that said trabecular core comprises a closed cell non-stochastic cellular structure.

13. An aircraft (A) comprising at least a component part (1, 2, 3, 4, 5, 6, 7, 8) provided with thermal de-icing means (S) suitable to eliminate or prevent the formation of ice on said component part (1, 2, 3, 4, 5, 6, 7, 8), wherein said thermal de-icing means (S) are directly integrated in the structure of said component part (1, 2, 3, 4, 5, 6, 7, 8), characterized in that said de-icing means (S) comprise a multi-layer panel (17) having an external sheet metal (11) that constitutes an aerodynamic surface of said part, and an internal layer (15), all made in a single piece comprising a trabecular core (12) having a cellular structure that provides turbulent flow of hot air through passages in said cellular structure which is formed in a single body which provides a structural function for said component part (1, 2, 3, 4, 5, 6, 7, 8) and said thermal deicing means (S) and also functions as a deicing duct, and at least one tube (13, 18) for spreading hot air is bled from an engine compressor (8) of said aircraft (A) into the trabecular core through a slot (14) in the internal layer of the multi-layer panel (17).

14. An aircraft (A) comprising a component part (1, 2, 3, 4, 5, 6, 7, 8) provided with thermal de-icing means (S) suitable to eliminate or prevent the formation of ice on said component part (1, 2, 3, 4, 5, 6, 7, 8), wherein said thermal de-icing means (S) are directly integrated in the structure of said component part (1, 2, 3, 4, 5, 6, 7, 8), characterized in that said de-icing means (S) comprise a multi-layer panel (17) having an external sheet metal (11) that constitutes an aerodynamic surface of said part, and an internal layer (15), all made in a single piece comprising a trabecular core (12) having a cellular structure comprising aluminum or titanium alloys in a single body that provides turbulent flow of hot air through passages in said cellular structure and which provides a structural function for said component part (1, 2, 3, 4, 5, 6, 7, 8) and said thermal deicing means (S) and also functions as a deicing duct, and at least one tube (13, 18) for spreading into the trabecular core through a slot (14) in the internal layer of the panel from which hot air is bled from an engine compressor (8) of said aircraft (A).

15. An aircraft according to claim 14 wherein said cellular structure is a non-stochastic cellular structure in a single body which provides a structural function for said component part (1, 2, 3, 4, 5, 6, 7, 8) and said thermal deicing means (S).

* * * * *